May 2, 1933. G. LUFKIN 1,906,695
GLASS MELTING FURNACE
Filed Nov. 26, 1930 3 Sheets-Sheet 1
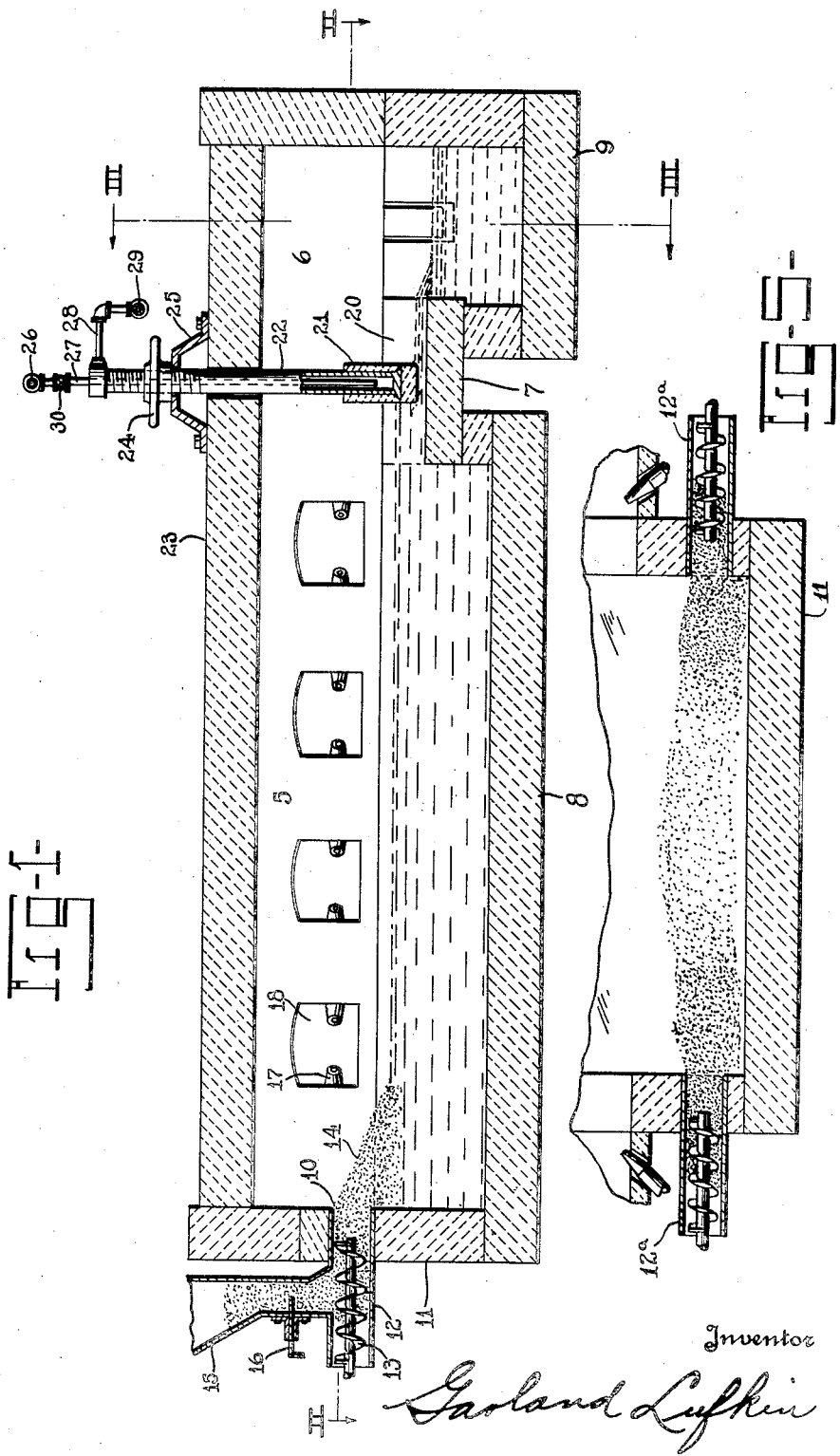

May 2, 1933.  G. LUFKIN  1,906,695
GLASS MELTING FURNACE
Filed Nov. 26, 1930  3 Sheets-Sheet 2
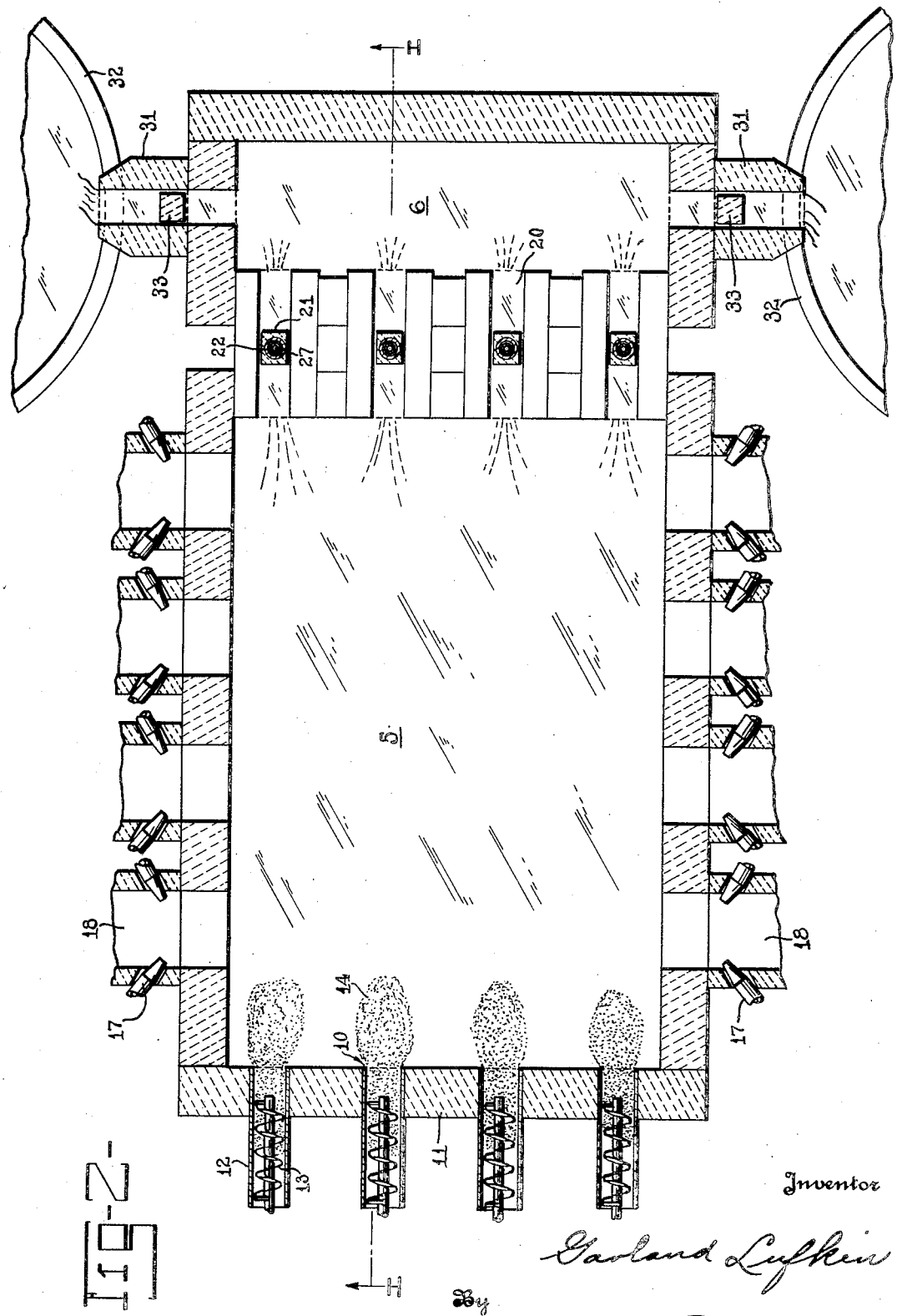

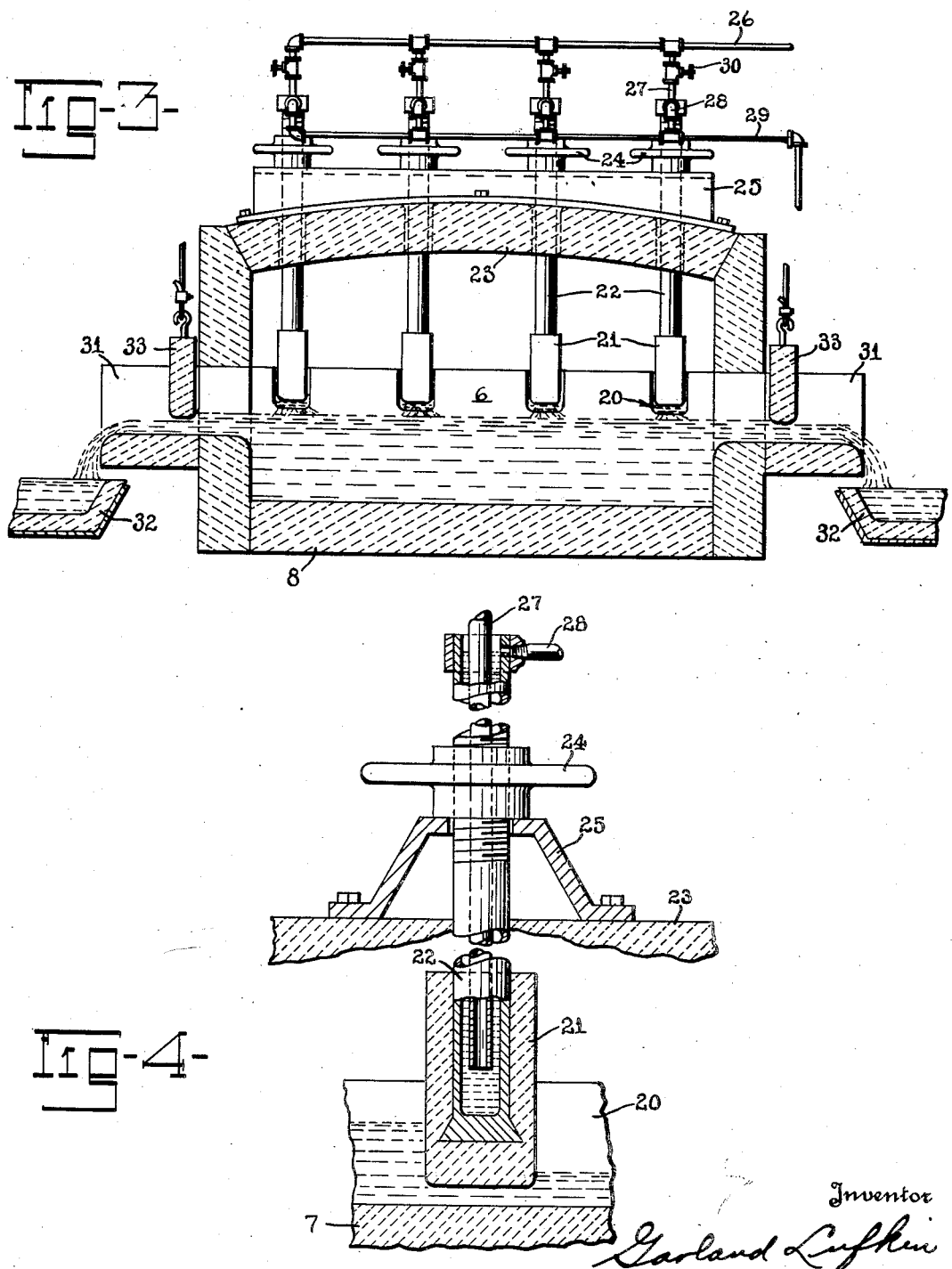

Patented May 2, 1933

1,906,695

UNITED STATES PATENT OFFICE

GARLAND LUFKIN, OF TOLEDO, OHIO, ASSIGNOR TO OWENS-ILLINOIS GLASS COMPANY, A CORPORATION OF OHIO

GLASS MELTING FURNACE

Application filed November 26, 1930. Serial No. 498,262.

My invention relates to furnaces of the continuous type for melting and refining glass.

In furnaces of this type in use at the present time, the full area of the melting surface is not utilized to the best advantage because there is no provision for adequately controlling the flow of glass across the entire width of the furnace. The glass is also subjected to convection currents which tend to keep the incompletely melted ingredients of the glass batch submerged below the surface for a large part of the time they are within the melting compartment. As a result, a comparatively long melting period and large amount of fuel are required.

An object of the present invention is to provide a construction which will be free from the objections above indicated. To this end the invention contemplates the use of a furnace having provision for feeding the batch or raw materials into the melting compartment at a plurality of points so spaced along the end wall of the furnace or otherwise arranged that an even distribution of the batch may be provided across the entire end of the furnace.

My invention also provides means whereby such even distribution of the glass across the furnace may be maintained during its passage through the melting compartment to the usual refining compartment. For this purpose, a plurality of spouts may be provided at intervals along the bridge wall which separates the melting and refining compartments, through which spouts a surface flow of the glass is maintained. Controlling devices individual to the spouts are adjustable to regulate and control the flow. This arrangement permits a surface flow of glass which is substantially uniform across the entire width of the tank, so that the glass is subjected to the maximum temperature during its travel through the melting compartment.

The invention further contemplates the use of a comparatively shallow melting compartment, whereby to minimize the effect of convection currents which tend to submerge the glass during its passage through the tank, the bottom blocks or floor of the tank being close enough to the surface to set up frictional resistance to convection flow and to provide a comparatively viscous layer of colder glass near the surface.

Other objects of the invention will appear hereinafter.

In the accompanying drawings:

Fig. 1 is a longitudinal sectional elevation of a furnace constructed in accordance with my invention, the section being taken at the line I—I on Fig. 2.

Fig. 2 is a sectional plan view at the line II—II on Fig. 1.

Fig. 3 is a sectional elevation through the refining compartment, the section being taken at the line III—III on Fig. 1.

Fig. 4 is a fragmentary sectional view illustrating particularly an adjustable plug and cooling means therefor.

Fig. 5 is a fragmentary sectional plan view showing a modification of the charging end of the melting tank.

The furnace as herein shown is of the continuously melting type and comprises a tank including a melting compartment 5 and a refining compartment 6, said compartments being separated by a bridge wall 7. The floor 8 of the melting compartment is preferably at a higher level than the floor 9 of the refining compartment, for purposes elsewhere pointed out. The batch of raw materials is fed into the furnace through openings 10 in the end wall 11, by means of batch feeders. Each feeder comprises a cylindrical feed chamber 12 in which is a spiral propeller blade 13 which may be rotated continuously or intermittently for forcing the batch 14 into the furnace. The speed of each feeder blade is adjustable, whereby the rate at which the materials are fed by the several feeders is selectively adjustable. The batch is supplied to the feed chamber 12 through a spout 15 provided with a valve 16 for cutting off or regulating the feed.

The feeders are arranged at intervals along the end wall, a sufficient number of feeders being used to provide a practically uniform distribution of the batch across the entire end of the furnace.

Burners 17 operate in the usual manner to supply fuel gases for mixture with the heated air supplied through the channels 18 to ports in the side walls of the melting tank, the burning gases being thereby spread for melting the batch.

The bridge wall 7 is provided with a series of troughs or passageways 20 in its upper surface, through which the glass flows from the melting chamber into the refining compartment. These troughs are arranged at intervals throughout the length of the bridge wall so that an even surface flow is obtained which extends across the entire furnace. In order that the rate of flow through each trough may be individually controlled, a controlling device or plug is provided for each trough. This controlling device (see Fig. 4) comprises a body 21 of refractory material and a tubular stem 22, which may be made of metal, embedded therein. The stem 22 extends upward through an opening in the roof 23 of the furnace and is provided with external screw threads to receive a correspondingly threaded adjusting wheel 24 which rests on a bracket 25 bolted to the roof 23. By rotating the hand wheel 24, the plug may be adjusted up and down in the trough 20 to adjustably vary the flow of glass therethrough. The plug 21 is designed to permit the circulation of a cooling medium, such as air or water, therethrough.

The means for circulating water through the plugs, as shown, comprises a supply pipe 26, with branch pipes 27 extending downward therefrom into the interior of the hollow stems 22. The water after circulating through the plugs is drawn off through pipes 28 which extend from the stems 22 near the upper ends thereof to a waste pipe 29. Valves 30 are provided in the pipes 27 for individually regulating or cutting off the flow to the several plugs.

The glass in the refining compartment may be withdrawn for use in any approved manner. As shown, a trough 31 is provided at each end of the refining chamber. The glass may flow through these troughs into revolving pots 32. The rate of flow through each trough 31 is regulated by a vertically adjustable plug 33.

It will be observed that the level of the glass in the melting compartment is higher than that in the refining compartment, so that a surface flow of glass can be maintained. This arrangement, in combination with the adjustable plugs 21, permits the rate of flow through each trough to be accurately controlled, so that a surface flow in the melting compartment may be maintained and regulated in a manner which would not be possible with the usual submerged passageway at or near the floor level of the tank. It will also be observed that the floor of the melting tank being at a higher level than that of the refining tank, the glass in the melting tank is comparatively shallow. This arrangement reduces the tendency of the partially melted glass to be submerged by convection currents, because the floor of the furnace is near enough the surface of the glass to offer a substantial frictional resistance to the convection flow of glass, and also provides cooler and more viscous glass comparatively near the surface, which further obstructs such convection flow. As a result, the glass ingredients may be kept within the effective heating zone of the burners so that the amount of fuel and length of time required to melt the glass are reduced to a minimum.

Fig. 5 illustrates a modified construction in which batch feeders 12$^a$ are positioned at opposite sides of the furnace and feed the batch of raw materials through openings in the side walls of the furnace closely adjacent to the end wall 11. The materials are fed into the furnace with sufficient pressure to cause a substantially uniform distribution of the materials entirely across the furnace adjacent the end wall 11.

Modifications may be resorted to within the spirit and scope of my invention.

What I claim is:

1. The combination of a glass melting tank, a plurality of batch feeders arranged at short intervals along an end wall of the tank at points above the normal level of the g'ass in the tank, and means at the opposite end of the tank for causing a surface flow of the glass therefrom, said means arranged to provide an even distribution of the flow along the discharge end of the tank.

2. A glass furnace comprising a tank, a bridge wall rising from the floor of the tank and separating it into a melting compartment and a refining compartment, said bridge wall extending across the furnace, and means for causing a surface flow of glass from the melting compartment to the refining compartment across said bridge wall and distributing the flow along the bridge wall to cause a substantially uniform surface flow throughout the width of the tank.

3. A glass furnace comprising a melting compartment and a refining compartment, a bridge wall there-between extending across the furnace, means for causing a surface flow of glass from the melting compartment to the refining compartment across said bridge wall, means for distributing said surface flow along the bridge wall comprising open channels arranged at short intervals along the upper surface of the bridge wall, and controlling devices individual to said channels and individually adjustable to regulate and control the flow of glass through the channels.

4. A glass furnace comprising a melting compartment, a refining compartment, and a bridge wall extending across the furnace between said compartments, said bridge wall formed with a plurality of channels at short intervals lengthwise thereof through which the glass flows from the melting to the refining compartment, said channels having their floors above the level of the floors of the melting and refining compartments, the channels being positioned and arranged to cause a surface flow of glass therethrough.

5. A glass furnace comprising a melting compartment, a refining compartment, and a bridge wall extending across the furnace between said compartments, the floor of said bridge wall being above the level of the floors of the melting and refining compartments, the bridge wall being formed with troughs or channels at short intervals along the upper surface portion thereof in position to permit a surface flow of glass from the melting to the refining compartment and to distribute said surface flow substantially uniformly across the width of the furnace.

6. A glass furnace comprising a melting compartment, a refining compartment, a bridge wall extending across the furnace between said compartments, said bridge wall formed with a plurality of channels in its upper surface at short intervals lengthwise thereof through which the glass flows from the melting to the refining compartment, and flow regulating devices individual to said channels and individually adjustable to adjustably regulate the flow through each said channel.

7. A glass furnace comprising a melting tank and a refining compartment, a bridge wall between said tank and compartment, a series of automatic batch feeders arranged along the end wall of the melting tank above the normal level of the glass in the tank, and a series of troughs at intervals along the upper surface of the bridge wall with their floors above the floor of the tank, said feeders and troughs being arranged to permit a surface flow of glass from the batch feeders to the bridge wall and over said wall into the refining compartment.

8. In combination, a glass furnace comprising a melting compartment, a refining compartment and a bridge wall extending across the furnace between said compartments, means for introducing raw materials into the melting compartment and distributing them substantially uniformly along the end of the melting compartment opposite said bridge wall prior to melting, and means cooperating with the bridge wall to direct a flow of glass from the melting to the refining compartment and distributing said flow substantially uniformly throughout the length of the bridge wall.

9. In combination, a glass furnace comprising a tank including a melting compartment and a refining compartment, a bridge wall rising from the floor of the tank and extending across the tank between said compartments, and means cooperating with the bridge wall for directing a surface flow of glass from the melting to the refining compartment in a direction perpendicular to the bridge wall and with the flow distributed substantially uniformly throughout the length of the bridge wall.

10. A furnace tank of substantially equal width throughout its length, a bridge wall rising from the floor of the tank and extending across the tank from one side thereof to the other, means for feeding batch into the tank at the receiving end thereof and causing a uniform distribution of the batch throughout the length of said end, and means for causing a surface flow of glass over the bridge wall and distributing said flow along the bridge wall so that there is an approximately uniform surface flow or movement of the glass over the entire area of the tank from said receiving end to the bridge wall.

11. A furnace tank of substantially equal width throughout its length, a bridge wall rising from the floor of the tank and extending across the tank from one side thereof to the other, means for feeding batch into the tank at the receiving end thereof and causing a uniform distribution of the batch throughout the length of said end, and means for causing a surface flow of glass over the bridge wall and distributing said flow along the bridge wall so that there is an approximately uniform surface flow or movement of the glass over the entire area of the tank from said receiving end to the bridge wall, said last mentioned means including adjusting devices arranged at short intervals along the bridge wall and individually adjustable to control the rate of flow.

Signed at Toledo, Ohio, this 21st day of November, 1930.

GARLAND LUFKIN.